March 5, 1940.   E. E. ROSAIRE ET AL   2,192,525
GEOPHYSICAL PROSPECTING METHOD
Filed Sept. 26, 1939

E.E. ROSAIRE
LEO HORVITZ
INVENTORS

BY P. L. Young
ATTORNEY.

Patented Mar. 5, 1940

2,192,525

UNITED STATES PATENT OFFICE 2,192,525

GEOPHYSICAL PROSPECTING METHOD

Esme E. Rosaire and Leo Horvitz, Houston, Tex.; said Horvitz assignor to said Rosaire Application September 26, 1939, Serial No. 296,556

15 Claims. (Cl. 23—232)

The present invention relates to a method and means for prospecting for oil, gas or other buried deposits that give rise to identifying diffusible constituents. The invention resides in the realm of geophysical prospecting through the instrumentality of chemical analysis for locating gas, oil and other masses that give rise, directly or indirectly, to diffusible constituents that are detectable at or near the surface of the earth. The fundamental concept of the invention comprises the procurement of samples of soil at or near the earth's surface, submitting such samples to quantitative analysis and then interpreting results from such analysis to ascertain the location of subsurface deposits.

Diffused gases liberated at the surface of the earth and due to buried deposits, have been recognized and it has been proposed to utilize such gases in geophysical prospecting by a study of the radio-activity or ionizing power of such gases. It has also been proposed to subject samples of air collected at or near the earth's surface to quantitative analysis in order to determine the amount of gaseous hydrocarbons in the samples, and hence to locate gas liberating substances or deposits to which the gaseous hydrocarbons bear a definite relation. These methods of prospecting have been used to a certain extent in spite of certain inherent difficulties. It is an object of the invention to provide a novel method of and means for geophysical prospecting by chemical analysis of diffusible constituents from buried deposits entrained in the soil and, at the same time, to obviate difficulties heretofore encountered.

A more specific object is the location of buried deposits by the study of samples of soil that have been subjected to the influences of diffusible constituents from the buried deposits.

A further object is to provide a method of determining directional requirements in drilling for oil and gas by determining hydrocarbon anomalies during the downward progress of drilling.

Another object is to provide a process of prospecting that is low in cost and is advantageously used to supplement other methods of prospecting.

A further object is the determination of the respective amounts of light hydrocarbons and heavy hydrocarbons in hydrocarbon gases entrained by the soil, whereby the presence of buried deposits is detected.

Another object is the provision of apparatus for analyzing the gas content of soil samples without subjecting the samples to contamination by the air.

It is also an object to provide a sample container which may be effectively sealed and from which the contents may be effectively expelled for analysis.

Other and further objects will be apparent from the following description taken in connection with the accompanying drawing in which Fig. 1 is a diagrammatic view illustrating a reconnaissance survey in accordance with the invention;

The method of the invention differs materially from those heretofore known and practiced. The methods usually practiced merely give indications of differences in geological strata while the present invention is concerned with direct detection of subterranean deposits. Since knowledge of geological strata is of importance, it is obvious that the process of the present invention may be used to supplement information obtained by other processes, or it may be used independently. As a matter of fact, the invention is particularly advantageous as a supplement to other methods of geophysical prospecting as soil samples for the present method may be procured simultaneously with the obtaining of data in other processes and with no slowing down of that work.

The method consists in procuring samples of soil from the area to be studied, sealing the soil samples from contamination and chemically analyzing the samples for those diffusible constituents which are liberated by buried deposits and are entrained in the nearby soil. The purpose of the invention therefore takes advantage of the fact that soil that has been subjected to the influences of gas for long periods of time absorbs or entrains considerable quantities of that gas and/or other products resulting from the deformation of the strata and/or the presence of the gas emanations. The exact nature of such absorbed gas in soil samples is uncertain. It may be adsorbed, absorbed, occluded or certain chemical changes in the soil itself may have taken place. However, regardless of the nature of the entrainment in the soil samples the process of the invention enables extraction thereof in sufficient quantities so that chemical analysis may readily be made. It is thus apparent that desired information may readily be obtained regardless of the nature of the terrain under observation. For example, satisfactory analysis may be had even though the area to be studied be under water or the terrain comprises sand, limestone or other well known materials that prevent satisfactory results from other methods.

Figure 1:
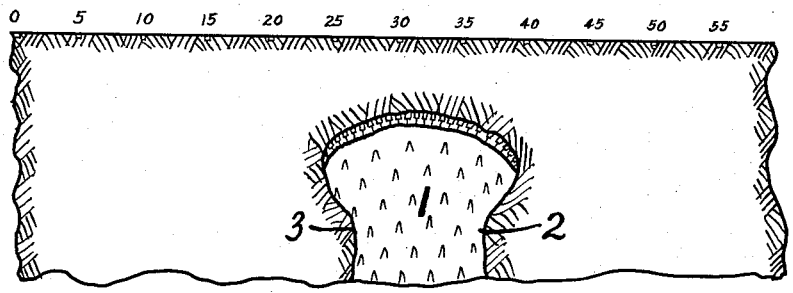

In order to illustrate a practical application of the invention, in Fig. 1 is shown a salt dome 1 having flanks 2 and 3. As is well known, oil and gas deposits are frequently found in proximity to flanks 2 and 3. It is to be understood, however, that the invention is not confined to locating of this particular type of structure nor to locating of only gas or oil. The invention is of utility in locating any deposit that gives rise to diffusible constituents that become apparent upon analysis of soil samples. In order to determine the location of deposits, in accordance with the present invention, soil samples are taken from a plurality of locations, such, for example, as points 0 to 55 in Fig. 1. For the sake of clearness, only a portion of soil sample locations are shown in the figure. The horizontal scale represents any suitable distance as, for example, one-tenth mile between samples.

Figure 2:
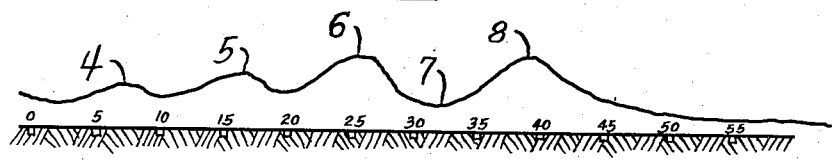
Fig. 2 is a graphical illustration of results obtained by the survey shown in Fig. 1.

In Fig. 2 is shown a curve generally designated as 4 plotted from the results obtained in analysis of soil samples obtained in Fig. 1. The ordinates of the curve 4 represent the values of any suitable quantitative measurement that bears a definite relation to the buried deposits. For example, the gas liberated from the soil samples together with the required oxygen may be passed over hot copper oxide or over a glowing platinum wire whereby carbon dioxide is evolved and may be collected and measured. In such case ordinates of curve 4 would represent the total carbon dioxide evolved from oxidation of the respective samples. On the other hand, determinations may be made of the respective amounts of light hydrocarbons, such as methane, and the heavier hydrocarbons, such as ethane, propane, etc. and results plotted therefrom to give desired information. For the purposes of illustration, however, the curve in Fig. 2 is plotted to represent the total carbon dioxide and is hence a measure of the total amount of hydrocarbons originally in the samples.

Results from the reconnaissance survey of Fig. 1 indicate a hydrocarbon anomaly in the vicinity of the location 10 as indicated by the small downward concavity 5. The importance of the finding may be determined by further detail study, such as that hereafter set forth. Greater anomalies appear from the samples at stations 25 and 40, as is revealed by downward concavities 6 and 8 in curve 4. These larger anomalies show an increased amount of subsurface diffusion beginning at station 20 and rising to a maximum in the neighborhood of station 25 and then dropping to a minimum near station 30 before rising to a second maximum at approximately station 40.

Figure 3:
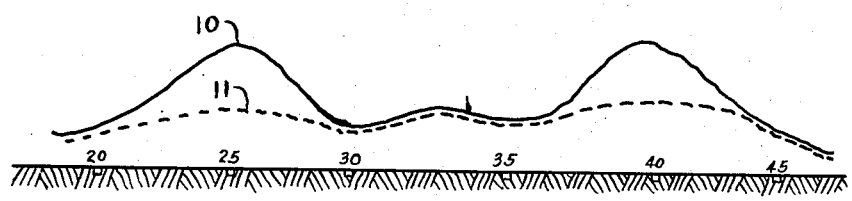
Fig. 3 is a graphical illustration of results obtained in a detail survey made in accordance with favorable indications obtained in the survey of Fig. 1.

After finding such anomalies on a reconnaissance survey a detailed survey is normally taken, although such procedure is not essential in all cases in the practice of the invention. Fig. 3 shows the results of such detail survey in which a greater density of sampling is used. In Fig. 3 the curve 4 of Fig. 2 is reproduced on a larger scale as curve 10 and hence represents the total carbon dioxide resulting from combustion of the gases liberated from the samples along the line of survey.

For purposes of illustration dotted curve 11 of Fig. 3 represents results obtained in the detailed survey and is plotted to show the methane content from the samples taken in the detail survey. Hence, it is apparent that the difference between the total hydrocarbon found in the reconnaissance survey and the methane found in the detail survey is due to the presence of hydrocarbons that are heavier than methane. This observation is of importance for it is well known that decaying vegetable matter gives rise to liberation of methane, while the presence of a heavy hydrocarbon is indicative of well known subterranean deposits. In the case of the anomaly shown the results obtained indicate that gas production only can be expected over the dome 1, while production of oil will be confined entirely to the uplifted beds on the sides of the dome.

Figure 4:
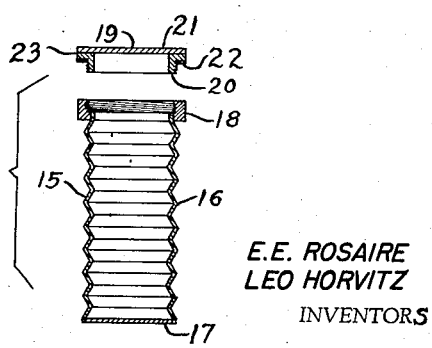
Fig. 4 illustrates a soil container that may be used in the practice of the invention.

The gas analysis to be made in practicing the invention may be carried out through the instrumentality of any suitable gas analysis equipment that will give sufficiently accurate results as, for example, the so-called Hartz diffusion apparatus for gas analysis. The analysis will preferably be made in the laboratory. Such being the case, it is necessary to provide suitable means for transferring soil samples from the field to the laboratory. Fig. 4 illustrates as an element of the invention a suitable container for this purpose. Such container generally designated as 15 is provided with corrugated walls 16, whereby the container may be collapsed axially. This feature is of importance in minimizing space in shipping empty containers and also in facilitating analysis of the contents as will be later described.

The bottom 17 is suitably sealed to the walls 16 of the container and at the opposite end a threaded flange 18 is similarly sealed thereto. A cap generally designated as 19 comprises a collar 20 which is threaded to fit the threads in flange 18. A gasket 22 is provided on collar 20, whereby a sealed joint between members 18 and 20 may be obtained. Collar 20 is also provided with a thin cover plate 21, preferably of copper which is hermetically sealed thereto as by solder, at the joint 23.

Figure 5:
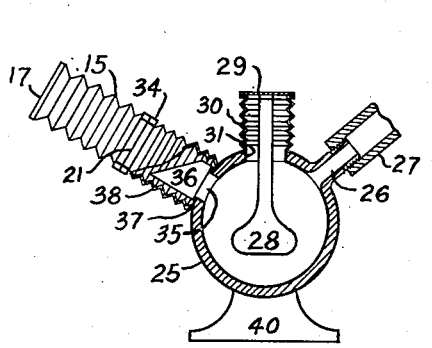
Fig. 5 illustrates a device for receiving soil samples and preparing them for chemical analysis.

Fig. 5 illustrates a device, whereby a soil sample that has been sealed in container 15 may be removed therefrom, without contamination by the air, and subjected to treatment for determination of entrained constituents therein. The illustrated device comprises an enclosed mortar 25 which is provided with an outlet 26 to which is attached suitable gas analysis equipment through tubular connector 27. Pestle 28 is attached to the top 29 of a flexible connector 30 which is sealed to the mortar at 31. This arrangement permits usual functioning of the pestle and mortar, while, at the same time, preventing contamination of the soil sample by the air.

The soil sample is introduced in the mortar through opening 35 in which is sealed a circular cutting plate 36. This cutting plate is surrounded by a flexible wall 38 which is sealed to the mortar wall at 37. The opposite end of wall 36 is provided with a collar having the same dimensions as the collar 20 of the sample container.

The device above described is provided with a base 40 through which, by means not shown, heat may be applied to assist in the liberation of volatilizable constituents from the soil sample.

Operation of the device is as follows:

A sealed soil sample container is hermetically attached to collar 34, thus completely enclosing mortar 25. The mortar is then evacuated through a suitable pump (not shown) and connector 27. Cover plate 21 is then severed by application of pressure to the base 17 of soil sample container 15. Pressure is continued in order to compress container 15, and thus forces the contents thereof into the mortar 25. Suitable crushing action of the soil sample through the instrumentality of the pestle 28 and the application of heat, will cause liberation of the volatilizable contents of the sample, which contents may be withdrawn through the connector 27 for analysis, whereby practical results of the invention are realized.

An important factor in the practice of the present invention is the depth at which soil samples are collected. In our investigations we have found that the significance of the results of the analyses of gas samples recovered from the soil samples appears to depend to a large extent upon the season of the year and even the weather. Thus, soil and soil gas anomalies which have been identified without question at one time do not seem to exist at other times, even when the existence of the anomaly has been confirmed by drilling wells which proved to be productive. In many instances known prospects were surveyed by the method of the present invention in which soil samples were taken at a depth of two to three feet without any evidence of a subterranean petroleum deposit being obtained. A resurvey of such areas by collecting samples at depths in excess of about ten feet or below the uppermost water level made possible an accurate outline of these prospects by the present invention.

As a result of our researches we have found that the anomalies are detectable at shallow depths in winter, but only at definitely greater depths in summer. Observations have been made in the Coastal Plains of the United States where the winter is characteristically the rainy season and the summer is the dry season. Anomalies which were evident in a survey conducted during the rainy season were not detectable when the survey was repeated during the dry season. For both surveys, the samples had been taken at a depth of from 1 to 3 feet. During the rainy season this depth was below the perched water table for many of the samples, and in all cases the samples were wet. In some of these wet samples, sufficiently significant amounts of leakage products were found to delineate the sought deposits. During the dry season when samples taken at the same depth were dry, very small or negligible amounts of leakage products were detected.

In the course of our investigations, however, it was found that the anomalies, apparently present no longer at depths of one, two or three feet, were present at depths of five feet and greater. In other words, the results of the shallow sampling in the wet season were duplicated by deeper sampling in the dry season. This behavior correlates with previous information about the properties of the soil.

It has been found that at times of appreciable daily temperature changes the soil breathes. In the day time the soil heats up and exudes soil gas. At night the soil cools off and takes in atmospheric air. Therefore, down to depths which vary with the daily temperature changes the porosity of the soil and other factors, the soil breathes and so the original soil air is diluted by atmospheric air.

This dilution may not be uniform, and so in this zone of dilution by atmospheric air the original soil gas is present in varying amounts. However, if the inherent porosity of the soil is modified, say by the presence of an excess of water, then this "breathing" is hindered, and after a given period the emanations from the buried deposit accumulate to such an extent that the dilution of the soil gas by the atmospheric air is no longer appreciable. Further, if the daily temperature change is reduced to a minimum by taking samples at such depths that the soil is not subject to atmospheric temperature changes, it is evident that the "breathing" of the soil will be a minimum, and, other things being equal, the dilution will be a minimum.

Regardless of the cause of the variation, it has been found that in order to obtain most accurate results the soil samples should be taken at a depth below which no substantial variation in the adsorbed constituents with respect to depth is found. It has been found that samples taken below either the natural or perched (temporary) water table are more satisfactory than those taken at shallower depths. The first evidence of a considerable amount of moisture, especially a water saturated sand, gives indication that sufficient depth has been reached.

Where geographical conditions are such that bodies of water occur, ideal samples can be taken from earth near the bottom of such a body of water. In such cases, the silt should be penetrated and the sample taken preferably in a bed of porous material, such as sand or sand clay under the silt bottom.

Conceivably, in certain instances, where the question of economy permits, artificial ponds may be prepared a few weeks or months in advance so that the soil to be sampled later can have time to absorb or adsorb, and retain the emanations to be sought by analysis.

From our investigations, it has become evident that bodies of water, either on the surface or in subterranean strata, serve as effective traps, below which the soil is capable of occluding, adsorbing or absorbing quantities of gases which emanate from deeper sources. The exact nature of this gas inclusion is not definitely understood as yet; but apparently wet soil, subjected to the presence of gaseous emanations for a considerable time, are capable of retaining the gas as long as dilution by atmospheric air does not occur.

In any case, soil samples should be collected at a depth below root levels of surface vegetation and below the depth penetrated by ploughs and other implements. To minimize variations due to seasonal changes it is advantageous to collect the samples below frost level and to this end it is desirable to maintain a minimum sampling depth of five feet, preferably in excess of ten feet. In all cases it is necessary that all samples collected for the purpose of surveying a given area be collected at substantially the same depth.

The soil samples obtained in the practice of the invention may be, and preferably are, analyzed in the laboratory which may be a great distance from the area surveyed. This feature is advantageous in that it enables concentration of equipment for accurate analysis and, at the same time, the use of but a small amount of inexpensive equipment in the field. A further and important advantage resides in the fact that, in view of the confidential nature of the work, the practical results are made available only to the parties authorizing the survey.

The taking of cores of formations penetrated has become a standard practice particularly in the rotary drilling of wells. The invention is of particular utility in connection with this practice. Frequent analysis of core material obtained during drilling permits the plotting of a log of the various hydrocarbon analyses which makes apparent any hydrocarbon anomaly that is present in the formations traversed. Such log will make apparent the fact that the drill approaches, passes through, or is adjacent to hydrocarbon bearing strata. Also, the keeping of a hydrocarbon log for a plurality of wells in a given area furnishes comparative information which will indicate suitable locations for other wells or suitable directional drilling whereby subterranean deposits may be tapped.

It is pointed out that the word "soil", as used in the specification and claims, is used in a generic sense to include any earth material, whether or not such material has been disintegrated as by weathering or chemical action. The soil referred to means soil samples, which are not part of or immediately adjacent the sought deposit. The invention is a method detection at a distance from the sought deposit and should not be confused with a method involving determination of the presence of paying deposits in the samples themselves or the strata from which such samples are taken.

Also, in carrying out the chemical analysis in the practice of the invention it is contemplated that chemical disintegration of the soil samples may be relied upon, if such procedure be deemed desirable or necessary.

For the purpose of definition it is pointed out that the subterranean deposits sought are deposits such as oil, gas and related bodies which are subject to leakage of diffusible constituents which become entrained in the soil in decreasing concentration as the distance from the deposits increases.

The present application is a continuation in part of our co-pending application Serial No. 107,497, filed October 24, 1936 and entitled Geophysical prospecting method, and includes the subject matter of our co-pending application Serial No. 154,468, filed July 19, 1937 and entitled geochemical prospecting.

While the invention has been described in connection with the preferred manner of practically carrying out the process and with preferred forms of apparatus, it will be understood that the invention is not restricted thereto, but is intended to include all modifications and variations in method and apparatus which fall within the scope of the appended claims.

We claim:

1. The method of detecting subterranean deposits from which leakage of emanations occur which comprises taking soil samples from selected points in a predetermined area, confining the respective soil samples from air contamination, removing said samples from confinement, and analyzing the samples with respect to gases contained in the samples directly related to said deposits.

2. The method of detecting subterranean petroliferous deposits which comprises collecting soil samples at laterally spaced points over an area to be investigated, confining the respective soil samples from air contamination, removing said samples from confinement, and analyzing the samples for hydrocarbons related to petroliferous deposits.

3. A method according to claim 2 in which all or the soil samples are collected below the surface of the area under investigation at the same depth.

4. In the art of exploration for subterranean deposits from which leakage of gaseous constituents occurs whereby such constituents become entrained in the soil at points remote from the deposits, the method of locating such deposits by determining the entrained constituents comprising the steps of systematically procuring soil samples in a predetermined area, vaporizing the volatilizable contents of said soil samples, and analyzing said contents quantitatively for the entrained constituents in the soil samples.

5. In the art of exploration for subterranean deposits from which leakage of diffusible constituents occurs, said constituents being manifest in the form of compounds entrained in the soil at a distance from the deposits, at least some of said compounds being normally non-gaseous, but becoming gaseous after suitable treatment, the method of locating such deposits comprising the steps of procuring soil samples from a predetermined area, treating said samples to liberate the volatilizable products in gaseous form and analyzing the evolved gases for constituents significant of the existence of the sought deposits.

6. In the art of exploration for subterranean petroliferous deposits the steps of procuring soil samples at spaced points over an area to be investigated, treating said samples to liberate volatilizable substances, entrained therein, in gaseous form, and analyzing evolved gases for hydrocarbons.

7. A method according to claim 6 in which all of the samples are collected at a depth of at least five feet.

8. A method according to claim 6 in which all of the samples are collected at a depth corresponding at least to the uppermost water table.

9. In the art of exploration for subterranean deposits from which leakage of constituents occurs, whereby such constituents become entrained in the soil at points remote from the deposits, wherein soil samples are collected for the purpose of determining their content of such entrained constituents, the method comprising treating the collected soil samples to liberate volatilizable constituents thereof in gaseous form, and analyzing the evolved gases for constituents which are significant of the existence of and proximity to the sought deposits.

10. In the method of exploration for subterranean petroliferous deposits wherein soil samples are collected for the purpose of determining their content of hydrocarbons associated with such deposits, the steps of treating the collected soil samples to liberate volatilizable contents thereof in gaseous form, and analyzing the evolved gases for hydrocarbons related to petroliferous deposits.

11. In the art of exploration for subterranean deposits from which leakage of gaseous fluids occurs whereby such fluids become adsorbed in the soil at points remote from the deposits, the method of locating such deposits by determining the adsorbed constituents comprising the steps of procuring soil samples from a depth below the water table whereby the samples will not have been subjected to flushing by atmospheric air, treating the samples to evolve the adsorbed gases, and anaylzing the evolved gases for hydrocarbons and their derivatives.

12. In the art of exploration for subterranean deposits from which leakage of gaseous fluids occurs whereby such fluids become adsorbed in the soil at points remote from the deposits, the method of locating such deposits by determining the adsorbed constituents comprising preparing a temporary artificial water table, taking samples of soil from beneath the trap formed by such prepared artificial water table, subjecting the soil samples to treatment to evolve entrained adsorbed constituents and analyzing the evolved constituents for indications of the proximity of carboniferous and petroliferous deposits.

13. A method according to claim 6 in which the evolved gases are analyzed for hydrocarbons heavier than methane.

14. A method for producing a map of an area overlying a subterranean petroliferous deposit on which said deposit is outlined, which comprises collecting soil samples at spaced points over the area to be mapped at a uniform depth substantially below the surface, noting the locations of the samples on a map of the area, subjecting each sample to a treatment suitable for the liberation therefrom of hydrocarbons contained therein, determining the amount of a selected hydrocarbon in the hydrocarbons liberated from each sample, and correlating on the map of the area the content of said hydrocarbon with the corresponding sample location.

15. A method according to claim 14 in which the hydrocarbon selected for quantitative determination is one heavier than methane.

ESME E. ROSAIRE.
LEO HORVITZ.